(12) United States Patent
Crawford et al.

(10) Patent No.: US 8,984,022 B1
(45) Date of Patent: Mar. 17, 2015

(54) AUTOMATING GROWTH AND EVALUATION OF SEGMENTATION TREES

(75) Inventors: Stuart Crawford, Piedmont, CA (US); Prasun Kumar, Bangalore (IN); Navin Doshi, Bangalore (IN); Xing Zhao, San Diego, CA (US); Richard Schiffman, San Rafael, CA (US)

(73) Assignee: Fair Isaac Corporation, San Jose, CA (US)

( * ) Notice: Subject to any disclaimer, the term of this patent is extended or adjusted under 35 U.S.C. 154(b) by 468 days.

(21) Appl. No.: 13/452,626

(22) Filed: Apr. 20, 2012

(51) Int. Cl.
| | |
|---|---|
| G06F 7/00 | (2006.01) |
| G06F 17/30 | (2006.01) |
| G06F 15/18 | (2006.01) |
| G06E 1/00 | (2006.01) |
| G06F 17/00 | (2006.01) |
| G06Q 40/08 | (2012.01) |
| G06Q 40/02 | (2012.01) |
| G06N 3/02 | (2006.01) |
| G06N 5/00 | (2006.01) |

(52) U.S. Cl.
CPC ......... *G06F 17/30327* (2013.01); *G06Q 40/08* (2013.01); *G06Q 40/025* (2013.01)
USPC ............ 707/803; 707/797; 706/12; 706/15; 706/21; 706/45; 703/2

(58) Field of Classification Search
None
See application file for complete search history.

(56) References Cited

U.S. PATENT DOCUMENTS 7,805,395 B2 * 9/2010 Howard et al. ............... 706/50

OTHER PUBLICATIONS

Zheng et al, 'Financial Distress Prediction Based on Decision Tree Models', 2007, IEEE, pp. 1-6.*

* cited by examiner

*Primary Examiner* — James Trujillo
*Assistant Examiner* — Cheryl M Shechtman
(74) *Attorney, Agent, or Firm* — Mintz Levin Cohn Ferris Glovsky and Popeo, P.C.

(57) ABSTRACT

A tree structure of plurality of information records arranged is recursively grown by splitting at least a portion of the records and by generating at least one predictive model. Related apparatus, systems, methods and computer program products are also described.

30 Claims, 9 Drawing Sheets

SCORECARD

| Model Weights | | |
|---|---|---|
| Variable / Bin | Weight Scaled | Weight Unscaled |
| Intercept term | 0 | 0.000 |
| appChkSv | | |
| Checking | 128 | 0.055 |
| Chk & Sv | 134 | 0.268 |
| None | 101 | -0.990 |
| Savings | 113 | -0.535 |
| ELSE | 127 | -0.000 |
| inquiriesExcludingMostRecent7daysCount | | |
| MV18 | 101 | -3.241 |
| MV19 | 181 | -0.152 |
| [-, 2) | 210 | 0.961 |
| [2, 4) | 192 | 0.276 |
| [4, 8) | 188 | 0.096 |
| [8, +) | 165 | -0.761 |
| All Other MVs | 185 | -0.000 |
| revolvingBurdenPercent | | |
| MV10 | 112 | -0.147 |
| MV15 | 101 | -0.589 |
| MV19 | 112 | -0.152 |
| MV27 | 113 | -0.133 |
| [-, 5) | 119 | 0.107 |
| [5, 15) | 133 | 0.626 |
| [15, 50) | 131 | 0.575 |
| [50, 80) | 129 | 0.484 |
| [80, 95) | 107 | -0.364 |
| [95, +) | 106 | -0.402 |
| All Other MVs | 116 | -0.000 |

450

FIG. 4C ern States, a "credit score" is a number that represents creditworthiness of a person, which can correspond to likelihood that that person will pay his or her debts.

AUTOMATING GROWTH AND EVALUATION OF SEGMENTATION TREES

TECHNICAL FIELD

This disclosure relates generally to data processing and, in particular, to automating growth and evaluation of data structures, such as trees, to discover a segmentation that can result in the most predictive scoring system for a complete population.

BACKGROUND

In the United States, a "credit score" is a number that represents creditworthiness of a person, which can correspond to likelihood that that person will pay his or her debts. Lenders, such as, banks, credit card companies, and other financial and governmental institutions, use such credit scores to evaluate risks posed by lending money to consumers. Credit scores are a good and cheaper way for such lenders to provide and for consumers to obtain credit.

There are a number of companies that are involved in determining credit scores for consumers (which can be individuals, businesses, or any other entities). One of the best known and used scores is a FICO score which is calculated statistically using information from a consumer's credit files and has been developed by Fair Isaac Corporation, Minneapolis, Minn., USA. The credit score typically provides a snapshot of risk that lenders use to help make lending decisions. For example, consumers having higher FICO scores might be offered better interest rates as well as higher amounts of credit, such as, mortgages, automotive loans, business loans, etc. The credit score is based on payment history (e.g., whether or not the consumer pays his/her bills on time), credit utilization (i.e., the ratio of current revolving debt (e.g., credit card balances) to the total available revolving credit or credit limit), length of credit history (i.e., a consumer that has a longer credit history may have a higher credit score), types of credit used (e.g., installment, revolving, consumer finance, mortgage), and recent searches for credit. Other factors such as, any money owed because of a court judgment, tax lien, having one or more newly opened consumer finance credit accounts, etc. can have an impact on the credit score. The credit scores can range between 300 and 850, where lower score indicates poorer creditworthiness of a consumer and higher score indicates a better creditworthiness of a consumer.

Various algorithmic approaches are used in the credit-score determination industry to determine a credit score for a consumer based on the available data (such as the data described above). One of the approaches includes a use of a classification and regression tree ("CART") algorithm. The CART algorithm involves a classification tree analysis and a regression tree analysis, both of which are decision tree learning algorithms that map observations about an item to conclusions about the item's target value. In these tree structures, leaves represent class labels and branches represent conjunctions of features that lead to those class labels. In decision analysis, a decision tree can be used to visually and explicitly represent decisions and decision making. The classification tree analysis is a decision tree learning algorithm where the predicted outcome can represent a class to which a particular data belongs (e.g., a homeowner, a renter, etc.). The regression tree analysis is a decision tree learning algorithm where the predicted outcome can represent a real number (e.g., height, age, etc.). For each decision tree to be assessed as a segmentation tree, a predictive model for every leaf node is developed and a hold-out sample for each leaf node with the appropriate model is scored. A segmentation tree defines logic for dividing a population into two or more subpopulations. Since the relationship between predictors and the target outcome can often vary between subpopulations, developing different models for different subpopulations frequently results in a more powerful scoring system compared to using a single model for the entire population. A model is trained for each leaf node, and the full scoring system is calibrated so the relationship between score and the predicted outcome is consistent across all leaf node models so total system performance for the full population can be calculated. A comparison of a total system performance of each decision tree being evaluated is carried out.

However, such classification and regression tree algorithms are optimized to directly predict the target variable, and have no ability to identify sub-populations with varying relationships that can exist between the predictors in each sub-populations and the target. As a result, these trees are unlikely to result in the best performing scoring system. Further, while there are thousands of potential candidate trees, only a small number of candidate trees can be evaluated with this approach, as configuration and subsequent evaluation of each candidate tree is a manual process.

SUMMARY

In some implementations, the current subject matter relates to a computer-implemented method. The method can include analyzing a plurality of information records arranged in a tree structure, the tree structure including a plurality of interconnected nodes, each node in the plurality of interconnected nodes including at least one record in the plurality of information records, splitting, using at least one variable parameter and based on the analyzing, at least a portion of records in the plurality of records into a plurality of split records, each split record in the plurality of split records comprising at least a portion of information contained in the record that the split record was split from, determining whether to further split each split record using at least another variable parameter and splitting each determined split record using the at least another variable parameter, generating a tree containing each split record and each further split record, generating, for each split record and for each further split record, at least one predictive model containing information related to each split record and each further split record, and repeating the splitting, the determining and the splitting, the generating the tree, and the generating the at least one predictive model, thereby recursively growing a tree structure based on the at least one split record. At least one of the analyzing, the splitting, the determining and the splitting, the generating the tree, the generating the at least one scorecard, and the repeating can be performed on at least one processor.

In some implementations, the current subject matter can include one or more of the following optional features. The method can include terminating the repeating based on at least one termination criteria. The termination criteria can include at least one of the following: a number of split records in the generated tree is less than a predetermined minimum number of records in the tree (e.g., no candidate splits can satisfy the minimum leaf counts (total or per outcome)), no candidate splits satisfy a minimum increase in an objective function, no further candidate trees can be created without violating a maximum number of leaf nodes, and a maximum time for performing the analyzing, the splitting, the determining and the splitting, the generating the tree, the generating the at least one score card, and the repeating is exceeded. A candidate split includes at least one record determined to be a candidate for splitting. A leaf node includes at least one record resulted from the splitting, where the at least one record contained in the leaf node cannot be further split. A candidate tree is created as a result of the generating the tree.

In some implementations, the method can include selecting at least one node from the plurality of generated trees, wherein the selected at least one node can include a greatest number of split records.

In some implementations, the analyzing operation discussed above can include receiving at least one target value, at least one candidate predictor variable and at least one splitter variable. At least one target value can be predicted based on analyzing, splitting, determining and splitting, generating the tree, generating at least one scorecard, and repeating operations discussed above. At least one candidate predictor variable can correspond to information contained in at least one record in the plurality of records. Candidate predictor variables can be selected from a library containing a predetermined number of candidate predictor variables and at least one grouping of at least a portion of the candidate predictor variables. At least one variable parameter and the at least one another variable parameter can be splitter variables that split a record into a plurality of split records. Splitter variables can be selected from a library containing a predetermined number of splitter variables and at least one indication for splitting at least one record in the plurality of records.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Operations specified by methods can be implemented by one or more data processors forming part of one or more computing systems.

The current subject matter provides many advantages. For example, the current subject matter enables segmentation of a population into distinct sub-populations to take advantage of varying relationships that can exist between the independent variables (predictors) in each sub-populations and the dependent variable (target). The current subject matter also provides an integrated suite of models that delivers superior predictions, compared to a single parent model, and compared to other segmented ensemble models produced by other systems.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 4a-c illustrate comprehensive segmentation discovery method along with an exemplary scorecard, according to some implementations of the current subject matter.

DETAILED DESCRIPTION

Provided herein are systems, methods, and computer program products for automating growth and evaluation of segmentation trees to discover a superior segmentation that results in the most predictive scoring system for a complete population.

In some implementations, the current subject matter relates to a model builder tool for creating various segmentation trees (such as trees used for determining creditworthiness of a particular consumer based on consumer's past credit history, on-time payment history, etc.). The model builder tool can create more profitable segmentations. The tool can further combine data-driven analysis with human expertise to create segmentations that are rendered as easy-to-view, editable trees. An example of such a model builder tool is available from Fair Isaac Corporation, Minneapolis, Minn., USA.

Figure 1A:
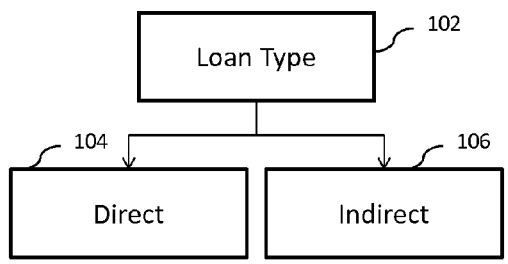
FIG. 1a illustrates a conventional segmentation tree model.
Figure 1B:
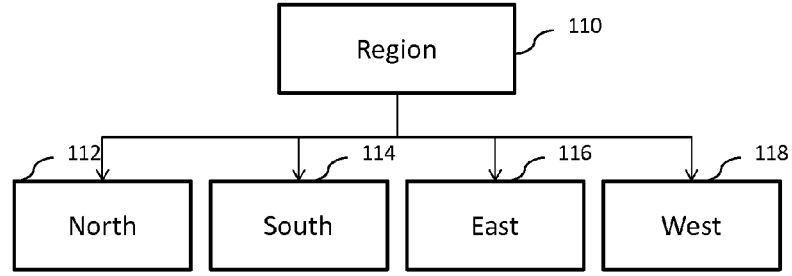
FIG. 1b illustrates another conventional segmentation tree model.

The model builder tool can mine data, and create segmentation trees based on historical data. The tool can examine and split segments algorithmically to produce branches that isolate similar target groups. Variables representing the most effective segmentation tree splits (based on performance measures such as credit risk, revenue, attrition, etc.) can be selected. The tool can further work across various products (e.g., mortgages, loans, credit card applications, leases, etc.), geographic locations, industries, as well as any other factors. An exemplary conventional segmentation tree model is illustrated in FIGS. 1a and 1b. FIG. 1a illustrates segmentation by loan type 102, where the types are direct 104 and indirect 106. FIG. 1b illustrates segmentation by geographical region 110, where the regions are north 112, south 114, east 116, and west 118.

In some implementations, determination of a particular factor relating to a candidate or an applicant (e.g., a risk factor relating to a particular loan candidate that shows how likely the candidate will or will not pay the loan) involves assessment of a variety of information, which can relate specifically to the applicant (e.g., cash balance, cash balance utilization, occupation, credit history, FICO score, age, marital status, gender, etc.), a geographical location related to the applicant, a population group related to the applicant, as well as any other factors. The information can be arranged or segmented in a form of a segmented tree model to help ascertain or "score" the applicant and/or each piece of information. The information can be arranged in nodes that are connected to one another using various predetermined relationship factors.

Figure 2A:
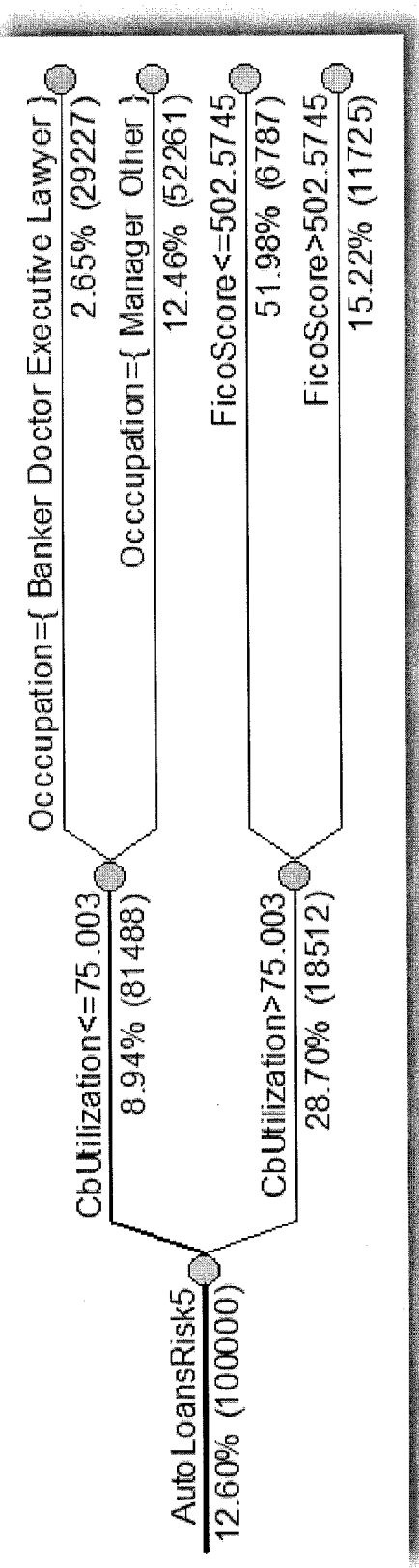
FIG. 2a illustrates a segmentation model tree that relates to determination of a risk with regard to a candidate applying for an auto loan.
Figure 2B:
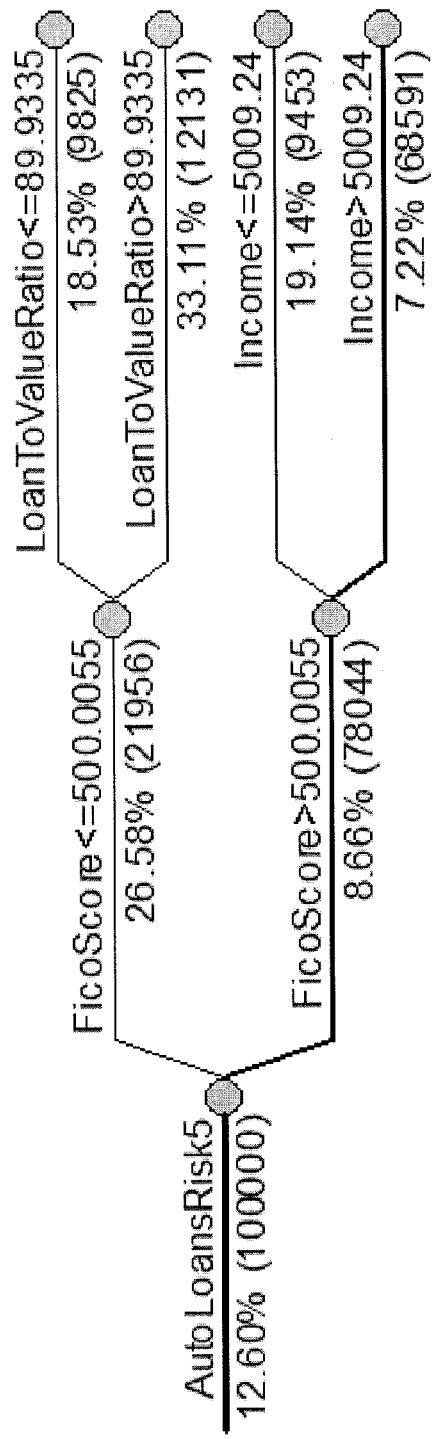
FIG. 2b illustrates another segmentation model tree that relates to determination of a risk with regard to another candidate applying for an auto loan.

FIGS. 2a and 2b illustrate exemplary segmentation model trees that relate to determination of risks with regard to two candidates (candidate 1 and candidate 2) applying for an auto loan. FIG. 2a illustrates a segmentation tree that is based on various scenarios associated with cash balance ("CB") utilization being less than or equal to or greater than a predetermined factor (75.003 as shown in FIG. 1). Upon determination of the appropriate CB utilization factor, various other factors are taken into account to assess risk of a particular candidate. For example, if the CB utilization is less than or equal to the predetermined factor, candidate's occupation is appropriately assessed. Alternatively, if the CB utilization is greater than the predetermined factor, candidate's FICO score is assessed.

As shown in FIG. 2b, the candidate's FICO score is initially assessed to determine the candidate's risk for an auto loan. Thus, in the shown segmentation tree, a first node corresponds to the candidate's FICO score being compared to a predetermined FICO score. If the score is less than or equal to the predetermined FICO score, loan-to-value ratios are evaluated in the second node. Alternatively, if the candidate's score is greater than the predetermined FICO score, the candidate's income is assessed in the second node. After assessing each of the factors, the candidates can be evaluated or scored based on the above and an appropriate determination can be made with regard to the candidate's risk for an auto loan. In some implementations, each piece of evaluated information can be assigned a particular weight, designation, identification, or other information that can be used in the final determination of the candidate's risk information. As shown in FIGS. 2a and 2b, each tree includes a root node (i.e., "AutoLoanRisk"), internal or branch nodes (i.e., "CB utilization" nodes in FIG. 2a and "FicoScore" nodes in FIG. 2b), and external or leaf nodes (i.e., "Occupation" and "FicoScore" nodes in FIG. 2a and "LoanToValueRatio" and "Income" nodes in FIG. 2b). An internal node is any node of a tree that has child nodes. An external node is any node that does not have child nodes.

In some implementations, in a segmented model, rather than building a single model to predict the target outcome (e.g., will a particular candidate pay his/her loan as agreed), it can be beneficial to develop a collection of models, where each model can be trained to take advantage of a unique relationship between the predictors (dependent variables) and the target (independent variable) for a specific subset of records. For example, when building models to be used for making decisions concerning credit card applications, the best predictors for candidates having little or no prior credit history can be different from the predictors for candidates having an established credit history. For the latter group, predictors that are based on credit bureau data such as duration of credit history, number of trade lines, worst rating, and other factors can add predictive power to the model. However, these predictors are unlikely to be of much value for candidates with limited credit history. Building segmented models can involve use of differences in predictive power and patterns across different segments, thereby enabling each subpopulation model to include different predictors and weights, leading to a more effective scoring solution.

As more information needs to be evaluated to predict the target outcome, the tree describing that information can be recursively grown with that information as well as additional nodes and splits that correspond to the information and particular evaluation. The tree can also be searched to locate appropriate information. Evaluation of information in the tree can be performed using a scorecard. In some implementations, a scorecard is a type of predictive model in which points are assigned to each predictor variables, based on value of the variable for the transaction or information being scored. The individual point values are added together to generate a score. In some implementations, this score can be used to rank-order the relative likelihood of a given outcome, such as delinquency, fraud, or expected collection amount. The segmentation search can include an automated training of scorecards to quantify true performance of each candidate split as the tree is recursively grown. The search can further retain the best N splits at each node for further growth (where N is an integer and can be predetermined by the user or a system), create a variety of similarly performing but differently structured trees, and avoid pitfalls associated with greedy searches. A greedy algorithm or search is an algorithm that follows a problem solving heuristic of making locally optimal choices at each stage with the hope of finding a global optimum. On some problems, a greedy algorithm need not produce an optimal solution, but nonetheless a greedy heuristic may yield locally optimal solutions that approximate a global optimal solution. The following is an exemplary problem where a greedy algorithm can fail to find a solution: given a hypothetical supply of coins worth $0.25, $0.10 and $0.04 (a 4-cent coin is provided and no pennies are included), determine the fewest coins that are need to make $0.41. The greedy algorithm will select the largest denomination coin that is not greater than the remaining amount and identifies the new remaining amount. The algorithm can proceed using the following steps: (1) determine that the remaining amount is $0.41 and select a coin of $0.25 (i.e., highest value coin<remaining amount); (2) determine that the remaining amount is $0.16 and select a coin of $0.10 (i.e., highest value coin<remaining amount); and (3) determine that the remaining amount is $0.06 and select a coin of $0.04 (i.e., highest value coin<remaining amount). This is where the greedy algorithm fails, as it is impossible to produce $0.06 using $0.04 coins as $0.02 or $0.01 coins are not available. Instead, this problem is solved by using a $0.25 and four $0.04 coins to make $0.41. In contrast, the current subject matter's searching method can retain the most promising candidate trees, and when the method terminates, comparison reports can be created documenting summary and detailed information for the most predictive segmentations trees to streamline review.

Inputs to the segmentation tree searching method can include a dataset containing a target variable (e.g., has the account ever been 60+ days past due?) to predict (binary or continuous) candidate predictors and splitter variables. Optionally, a sample weight variable can also be added as an input. Further, a predictor binning library defining a universe of candidate predictor variables and their binnings (i.e., groupings) and a splitter binning library defining the universe of candidate splitter variables and the potential split points/groupings can be input to the searching method. Additionally, a parent model used to provide the training configuration for evaluating the quality of each candidate split can serve as further input. Further, input parameters can include zero or more candidate trees to compare to newly discovered trees and zero or more candidate tree trunks to grow into complete trees.

In some implementations, candidate predictors can be data elements that are known at the time the score is calculated. These can include credit bureau information, application information, or any other pertinent available information. A data element can be both a candidate predictor and a candidate splitter.

Figure 3:
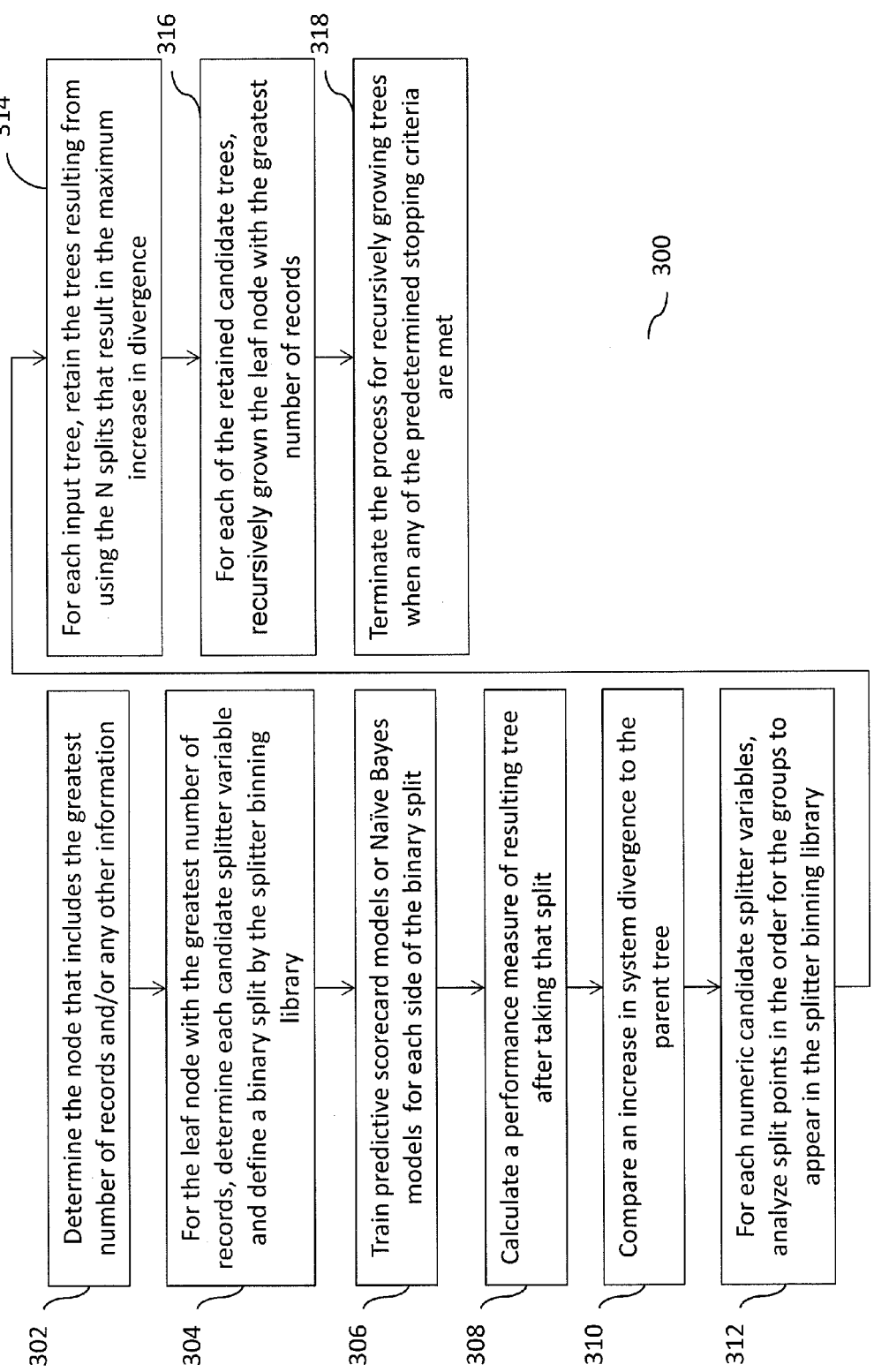
FIG. 3 illustrates tree searching and/or evaluation method, according to some implementations of the current subject matter.
Figure 4A:
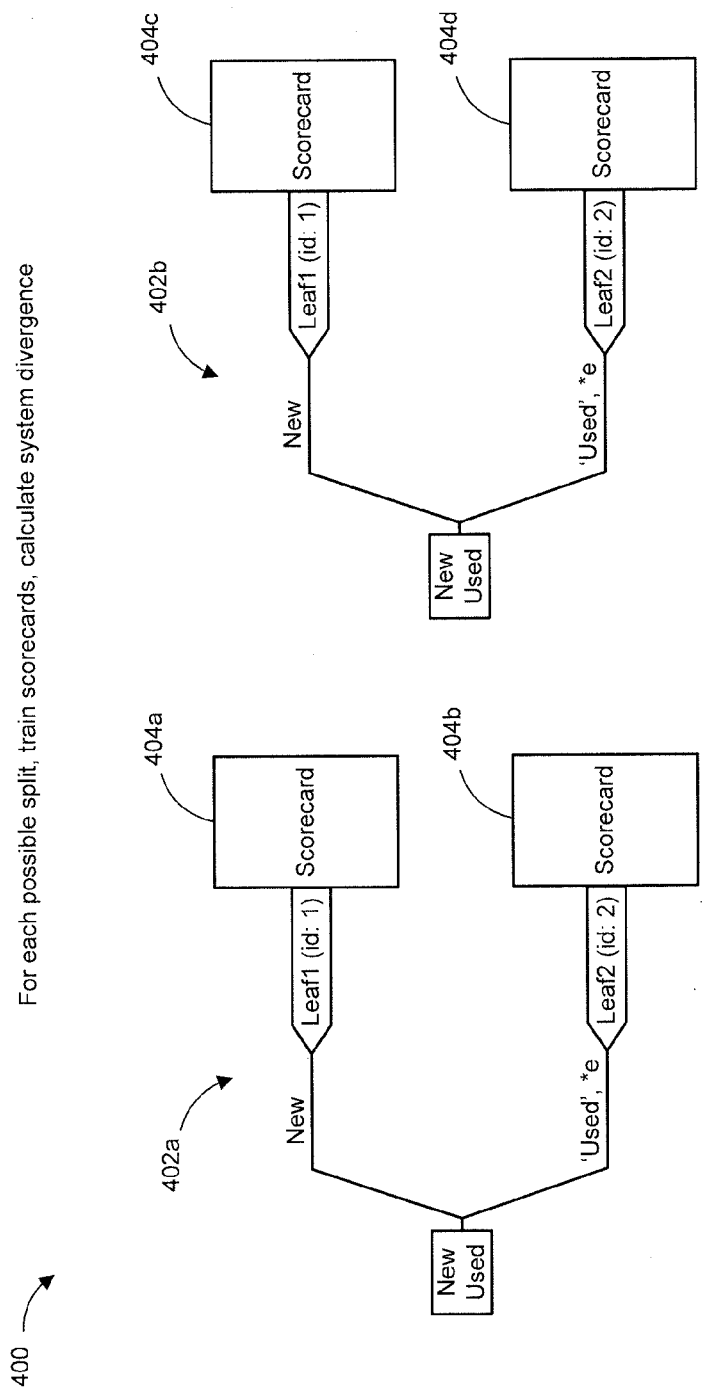
Figure 4B:
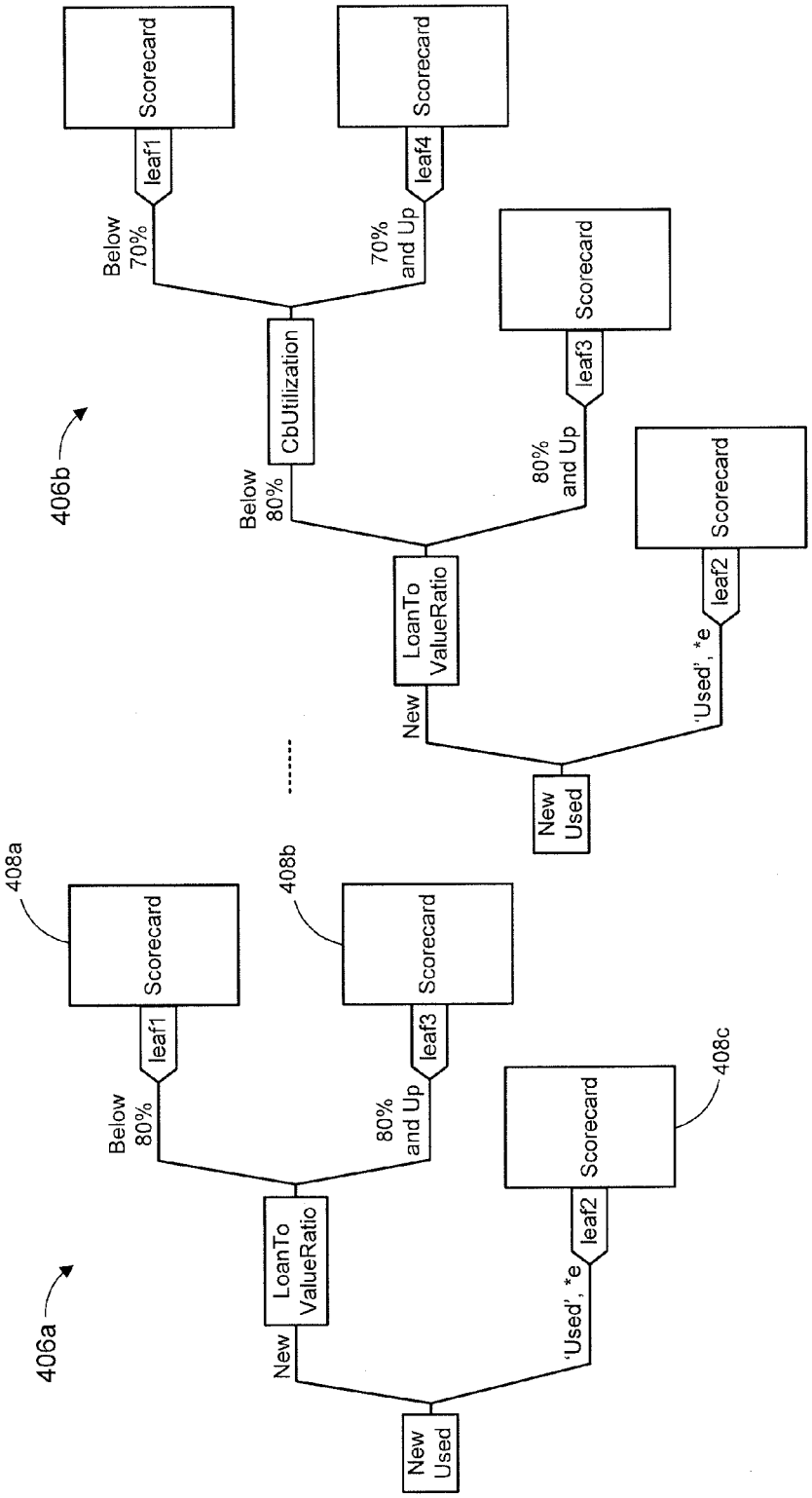

FIG. 3 illustrates an exemplary tree searching and/or evaluation method 300, according to some implementations of the current subject matter. The method 300 can automate growth and evaluation of segmentation trees. The method, for each possible split in the tree, can train scorecards corresponding to the information in the node as well as calculate tree performance. Then, best splits can be retained and the method can be repeated until predetermined stopping criteria are met. FIGS. 4a-b illustrate an exemplary comprehensive segmentation discovery method 400 and FIG. 4c illustrates an exemplary scorecard 450, according to some implementations of the current subject matter. The following provides a more detailed overview of the method 300. As shown in FIGS. 4a-b, the information contained in the tree split 402(a, b) is evaluated and scorecards 404(a, b, c, d) for each piece of information contained in the split are developed or trained. The scorecards 404 can be trained for each tree split 402. In some implementations, the scorecards 404 can contain various information (e.g., identification, relevance, influence on other information, scoring weight of that information, relationship to other information (whether or not in the same tree/split/node or not)) about a particular piece of information or record in the tree/split/node. In some implementations, there can be any number of tree splits 402 that are evaluated whether or not the split is contained within the same tree or across different trees. Once the scorecards are evaluated, a tree's performance factor (e.g., how diverse the information in the tree is) in the tree split(s) is determined. The splits leading to better tree performance are retained for further evaluation/analysis (e.g., see split 406a having score cards 408(a, b, c)) in determining the target outcome.

Referring back to FIG. 3, at 302, the method 300 can determine the node that includes the greatest number of records and/or any other information. Such node can be a leaf node and/or a root node. At 304, for the leaf node with the greatest number of records, each candidate splitter variable can be determined and a binary split can be defined by the splitter binning library. At 306, predictive scorecard models or Naïve Bayes models can be trained for each side of the binary split and at 308, a performance measure of resulting tree can be calculated after taking that split. At 310, an increase in system divergence compared to the parent tree can be calculated. A Naïve Bayes model or an independent feature model involves a method of maximum likelihood, where one can work with a Naïve Bayes model without believing in Bayesian probability or using any Bayesian methods. The model can implement a naive Bayes classifier that assumes that the presence (or absence) of a particular feature of a class is unrelated to the presence (or absence) of any other feature, given the class variable. Referring back to FIG. 3, at 312, for each numeric candidate splitter variables, split points can be analyzed in the order for the groups to appear in the splitter binning library. For string variables, if there are four or fewer groups, every combination of groups can be considered as the binary split (e.g., N=2, where N is the number of groups defined for the variable). For example, assuming that the groups are {red, green, blue}, there can be three splits: red and green∥blue, green and blue∥red, and blue and green∥red ("∥" indicating a split). If there are more than four groups, then the binary splits can be limited to each single group versus all other groups (N splits), and each pair of groups including the first group versus all other groups (N−1 splits), thus there are 2N−1 splits in total.

In some implementations, in order to shorten the search execution time, surrogate splits can be excluded from being used to grow the trees. If two different splits partition the records for a node in a similar way, they are called surrogate splits. There is a configurable similarityThreshold parameter that defines the percentage of records that must be distributed in same way for a split to be called a surrogate of the original split.

At 314, for each input tree, the trees resulting from using the N splits (where N can be a user-defined parameter) that result in the maximum increase in divergence can be retained. At 316, for each of the retained candidate trees, the leaf node with the greatest number of records can be recursively grown (as discussed above and as shown in FIG. 4). At 318, when any of the predetermined stopping criteria are met, the process for recursively growing trees is terminated.

An example of the stopping criteria includes a situation where no split being found to increase overall system performance. Another example of the stopping criteria includes a situation where a number of total records or a record per outcome class falls below a predetermined threshold. A further example includes a situation when trees can no longer be grown while satisfying the maximum number of leaf node criteria. Alternatively, when a maximum execution time has been reached, the method can terminate as well.

Once the searching method terminates, the M best performing trees can be generated, where M is an integer that is greater than or equal to one and can be specified by the user. In some implementations, M can be less than or equal to the original number of evaluated trees. Additionally, the method 300 can be configured to generate various reports. One of the reports includes a segmentation summary report. This report can generate results of a comparison between the structure and performance of the M best performing trees. Another report can include a tree detail report. This report describes the segmentation logic, population flow, and variable usage and importance across leaf models for each tree. Additionally, a leaf details report can be produced, whereby for each tree, the report can provide model training details for each leaf node model.

The following is an example of how candidate splitter variables can be analyzed using the method 300. Starting from the root node, the method 300 can analyze the first candidate splitter. Assuming that the first candidate splitter is application type, and can have values of "New Auto Loan", "Used Auto Loan", and/or "New Auto Lease", the first binary split can be {"New Auto Loan" and "Used Auto Loan"∥"New Auto Lease"}. Predictive models can be trained for these two subpopulations, and system's performance can be calculated. The second split that can be analyzed will be "New Auto Loan" and "New Auto Lease"∥"Used Auto Loan"}. The third split that can be analyzed will be {"Used Auto Loan" and "New Auto Lease"∥"New Auto Loan"}. Predictive models can be trained for these two subpopulations, and system's performance can be also calculated. The above three splits can represent all possible binary splits for a variable with 3 values, and from these three candidate splits. The method 300 can then proceed to the next candidate splitter and repeat the process. After all candidate splitters have been analyzed, the trees associated with the best M splits can be retained and recursively grown.

Figure 5:
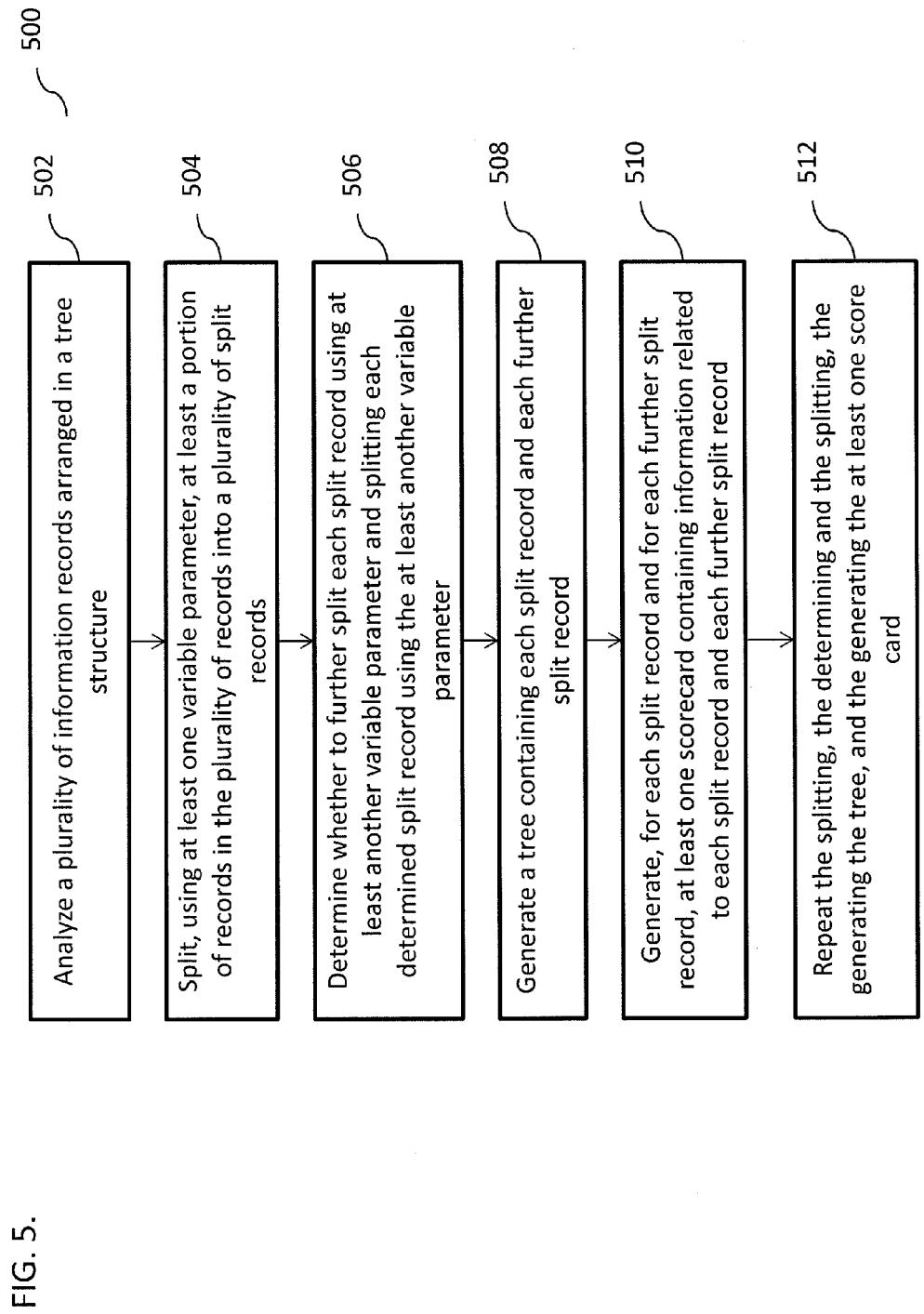
FIG. 5 illustrates a method, according to some implementations of the current subject matter.

FIG. 5 illustrates an exemplary method 500, according to some implementations of the current subject matter. At 502, a plurality of information records arranged in a tree structure can be analyzed. The tree structure can include a plurality of interconnected nodes. Each node in the plurality of interconnected nodes can include at least one record in the plurality of information records. At 504, using at least one variable parameter, at least a portion of records in the plurality of records can be split into a plurality of split records. A split record in the plurality of split records can contain at least a portion of information contained in the record that the split record was split from. In some implementations, a node can contain N records and after being split, its child nodes will contain n and N-n records. The records contained in the child nodes can be called "split records." At 506, a determination can be made whether to further split each split record using at least another variable parameter. If so, each determined split record can be further split using the at least another variable parameter. At 508, a tree containing each split record and each further split record can be generated. At 510, for each split record and for each further split record, at least one predictive model containing information related to each split record and each further split record can be generated. At 512, the splitting, the determining and the splitting, the generating the tree, and the generating the at least one predictive model can be repeated, thereby recursively growing a tree structure based on the at least one split record. At least one of the analyzing, the splitting, the determining and the splitting, the generating the tree, the generating the at least one score card, and the repeating is performed on at least one processor.

In some implementations, the current subject matter can include at least one of the following optional features. The method can include termination of the repeating illustrated at 512, based on at least one termination criteria. The termination criteria includes at least one of the following: no further splitting of records is available (e.g., no candidate splits can satisfy a minimum increase in an objective function), a number of split records configured to result from the splitting can be greater than a predetermined maximum number of split records (e.g., no further candidate trees can be created without violating a maximum number of leaf nodes), a number of split records in the generated tree is less than a predetermined minimum number of records in the tree (e.g., no candidate splits can satisfy the minimum leaf counts (total or per outcome)), and an execution time for performing the analyzing, the splitting, the determining and the splitting, the generating the tree, the generating the at least one score card, and the repeating is exceeded (e.g., a maximum search time has been met).

The method can also include selecting at least one node from the plurality of generated trees, wherein the selected at least one node can have a greatest number of split records.

In some implementations, analysis of a plurality of information records can be arranged in a tree structure can include at least one target value, at least one candidate predictor variable and at least one splitter variable. The target value can be predicted based on operations 504-512 as discussed above in connection with FIG. 5. The candidate predictor variable can correspond to information contained in at least one record in the plurality of records. The candidate predictor variables can be selected from a library containing a predetermined number of candidate predictor variables and at least one grouping of at least a portion of the candidate predictor variables. The variable parameter and another variable parameter can be splitter variables that can split a record into a plurality of split records. The splitter variables can be selected from a library containing a predetermined number of splitter variables and at least one indication for splitting at least one record in the plurality of records.

Figure 6:
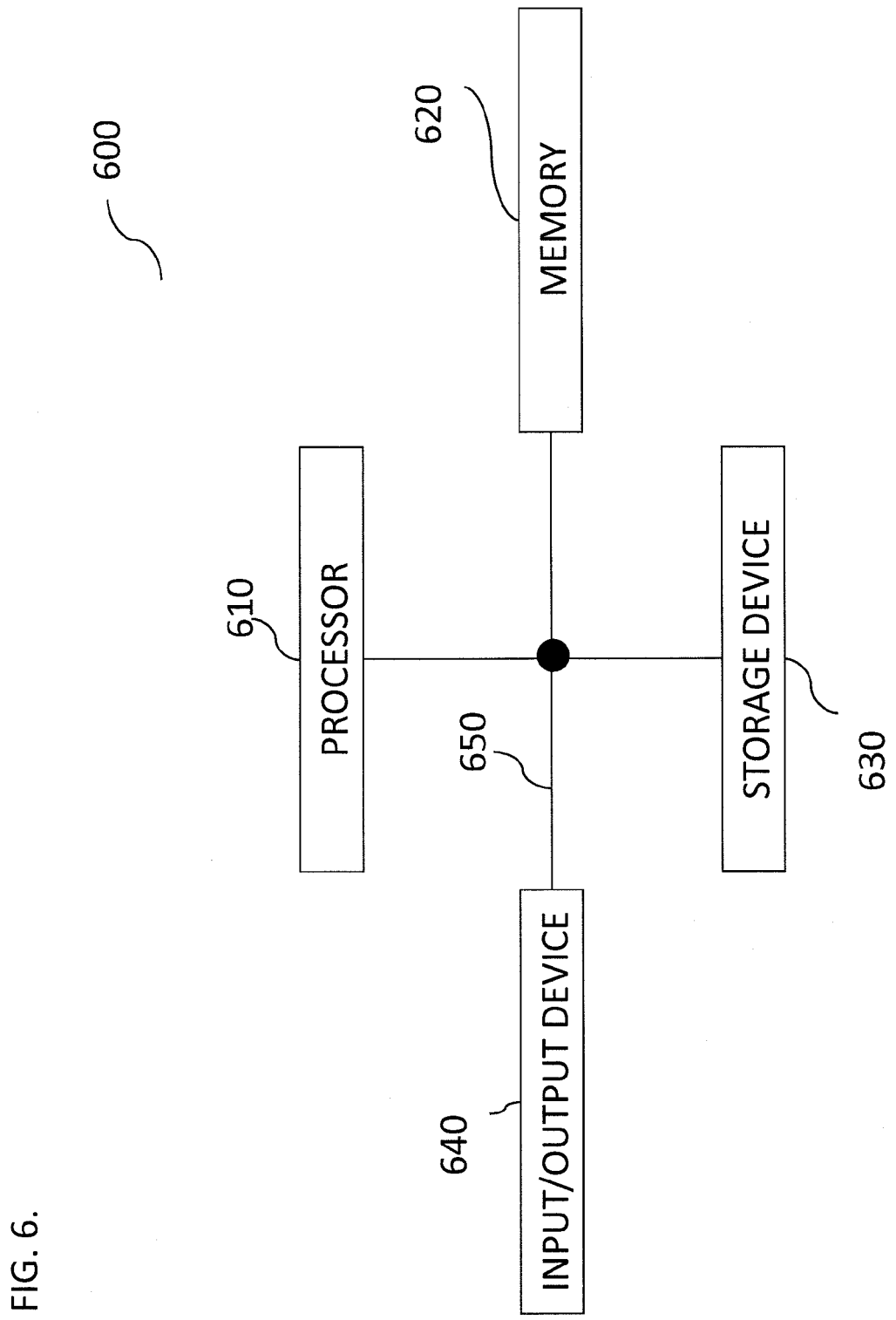
FIG. 6 illustrates a system, according to some implementations of the current subject matter.

In some implementations, the current subject matter can be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can process instructions for execution within the system 600. In some implementations, the processor 610 can be a single-threaded processor. In alternate implementations, the processor 610 can be a multi-threaded processor. The processor 610 can further process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can provide input/output operations for the system 600. In some implementations, the input/output device 640 can include a keyboard and/or pointing device. In alternate implementations, the input/output device 640 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation by one or more data processors forming part of at least one computing system, the method comprising:

analyzing, by at least one data processor, a plurality of information records arranged in a tree structure, the tree structure including a plurality of interconnected nodes, each node in the plurality of interconnected nodes including at least one record in the plurality of information records;

splitting, by at least one data processor using at least one variable parameter and based on the analyzing, at least a portion of records in the plurality of records into a plurality of split records, each split record in the plurality of split records comprising at least a portion of information contained in the record that the split record was split from;

determining, by at least one data processor, whether to further split each split record using at least another variable parameter and splitting each determined split record using the at least another variable parameter;

generating, by at least one data processor, a tree containing each split record and each further split record;

generating, by at least one data processor for each split record and for each further split record, at least one predictive model containing information related to each split record and each further split record; and repeating, by at least one data processor, the splitting, the determining and the further splitting, the generating the tree, and the generating the at least one predictive model, thereby recursively growing a tree structure.

2. The method according to claim 1, further comprising:
terminating, by at least one data processor, the repeating based on at least on termination criteria.

3. The method according to claim 2, wherein the termination criteria includes at least one of the following: a number of split records in the generated tree is less than a predetermined minimum number of records in the tree, no candidate splits satisfy a minimum increase in an objective function, no further candidate trees can be created without violating a maximum number of leaf nodes, and a maximum time for performing the analyzing, the splitting, the determining and the further splitting, the generating the tree, the generating the at least one predictive model, and the repeating is exceeded;

wherein a candidate split includes at least one record determined to be a candidate for splitting;

a leaf node includes at least one record resulted from the splitting, where the at least one record contained in the leaf node cannot be further split; and, a candidate tree is created as a result of the generating the tree.

4. The method according to claim 1, further comprising:
selecting, by at least one data processor, at least one node from the plurality of generated trees, wherein the selected at least one node comprises a greatest number of split records.

5. The method according to claim 1, wherein the analyzing further comprises:
receiving, by at least one data processor, at least one target value, at least one candidate predictor variable and at least one splitter variable.

6. The method according to claim 5, wherein the at least one target value is predicted based on the analyzing, the splitting, the determining and the further splitting, the generating the tree, the generating the at least one predictive model, and the repeating.

7. The method according to claim 5, wherein the at least one candidate predictor variable corresponds to information contained in at least one record in the plurality of records.

8. The method according to claim 7, wherein the candidate predictor variables are selected from a library containing a predetermined number of candidate predictor variables and at least one grouping of at least a portion of the candidate predictor variables.

9. The method according to claim 5, wherein the at least one variable parameter and the at least one another variable parameter are splitter variables that split a record into a plurality of split records.

10. The method according to claim 9, wherein the splitter variables are selected from a library containing a predetermined number of splitter variables and at least one indication for splitting at least one record in the plurality of records.

11. A system, comprising:
at least one programmable processor; and
a machine-readable medium storing instructions that, when executed by the at least one programmable processor, cause the at least one programmable processor to perform operations comprising:
analyzing a plurality of information records arranged in a tree structure, the tree structure including a plurality of interconnected nodes, each node in the plurality of interconnected nodes including at least one record in the plurality of information records;
splitting, using at least one variable parameter and based on the analyzing, at least a portion of records in the plurality of records into a plurality of split records, each split record in the plurality of split records comprising at least a portion of information contained in the record that the split record was split from;
determining whether to further split each split record using at least another variable parameter and splitting each determined split record using the at least another variable parameter;
generating a tree containing each split record and each further split record;
generating, for each split record and for each further split record, at least one predictive model containing information related to each split record and each further split record; and repeating the splitting, the determining and the further splitting, the generating the tree, and the generating the at least one predictive model, thereby recursively growing a tree structure.

12. The system according to claim 11, the operations further comprising
terminating the repeating based on at least on termination criteria.

13. The system according to claim 12, wherein the termination criteria includes at least one of the following: a number of split records in the generated tree is less than a predetermined minimum number of records in the tree, no candidate splits satisfy a minimum increase in an objective function, no further candidate trees can be created without violating a maximum number of leaf nodes, and a maximum time for performing the analyzing, the splitting, the determining and the further splitting, the generating the tree, the generating the at least one predictive model, and the repeating is exceeded;
wherein
a candidate split includes at least one record determined to be a candidate for splitting;
a leaf node includes at least one record resulted from the splitting, where the at least one record contained in the leaf node cannot be further split; and,
a candidate tree is created as a result of the generating the tree.

14. The system according to claim 11, the operations further comprising
selecting at least one node from the plurality of generated trees, wherein the selected at least one node comprises a greatest number of split records.

15. The system according to claim 11, wherein the analyzing further comprises
receiving at least one target value, at least one candidate predictor variable and at least one splitter variable.

16. The system according to claim 15, wherein the at least one target value is predicted based on the analyzing, the splitting, the determining and the further splitting, the generating the tree, the generating the at least one predictive model, and the repeating.

17. The system according to claim 15, wherein the at least one candidate predictor variable corresponds to information contained in at least one record in the plurality of records.

18. The system according to claim 17, wherein the candidate predictor variables are selected from a library containing a predetermined number of candidate predictor variables and at least one grouping of at least a portion of the candidate predictor variables.

19. The system according to claim 15, wherein the at least one variable parameter and the at least one another variable parameter are splitter variables that split a record into a plurality of split records.

20. The system according to claim 19, wherein the splitter variables are selected from a library containing a predetermined number of splitter variables and at least one indication for splitting at least one record in the plurality of records.

21. A computer program product comprising a non-transitory machine-readable medium storing instructions that, when executed by at least one programmable processor, cause the at least one programmable processor to perform operations comprising:
analyzing a plurality of information records arranged in a tree structure, the tree structure including a plurality of interconnected nodes, each node in the plurality of interconnected nodes including at least one record in the plurality of information records;

splitting, using at least one variable parameter and based on the analyzing, at least a portion of records in the plurality of records into a plurality of split records, each split record in the plurality of split records comprising at least a portion of information contained in the record that the split record was split from;

determining whether to further split each split record using at least another variable parameter and splitting each determined split record using the at least another variable parameter;

generating a tree containing each split record and each further split record;

generating, for each split record and for each further split record, at least one predictive model containing information related to each split record and each further split record; and repeating the splitting, the determining and the further splitting, the generating the tree, and the generating the at least one predictive model, thereby recursively growing a tree structure.

22. The computer program product according to claim 21, the operations further comprising terminating the repeating based on at least on termination criteria.

23. The computer program product according to claim 22, wherein the termination criteria includes at least one of the following: a number of split records in the generated tree is less than a predetermined minimum number of records in the tree, no candidate splits satisfy a minimum increase in an objective function, no further candidate trees can be created without violating a maximum number of leaf nodes, and a maximum time for performing the analyzing, the splitting, the determining and the further splitting, the generating the tree, the generating the at least one predictive model, and the repeating is exceeded;

wherein
a candidate split includes at least one record determined to be a candidate for splitting;

a leaf node includes at least one record resulted from the splitting, where the at least one record contained in the leaf node cannot be further split; and, a candidate tree is created as a result of the generating the tree.

24. The computer program product according to claim 21, the operations further comprising selecting at least one node from the plurality of generated trees, wherein the selected at least one node comprises a greatest number of split records.

25. The computer program product according to claim 21, wherein the analyzing further comprises receiving at least one target value, at least one candidate predictor variable and at least one splitter variable.

26. The computer program product according to claim 25, wherein the at least one target value is predicted based on the analyzing, the splitting, the determining and the further splitting, the generating the tree, the generating the at least one predictive model, and the repeating.

27. The computer program product according to claim 25, wherein the at least one candidate predictor variable corresponds to information contained in at least one record in the plurality of records.

28. The computer program product according to claim 27, wherein the candidate predictor variables are selected from a library containing a predetermined number of candidate predictor variables and at least one grouping of at least a portion of the candidate predictor variables.

29. The computer program product according to claim 25, wherein the at least one variable parameter and the at least one another variable parameter are splitter variables that split a record into a plurality of split records.

30. The computer program product according to claim 29, wherein the splitter variables are selected from a library containing a predetermined number of splitter variables and at least one indication for splitting at least one record in the plurality of records.

\* \* \* \* \*